March 27, 1945.  R. F. NICKERSON  2,372,601
CORD AND METHOD OF MAKING SAME
Filed May 27, 1941  2 Sheets-Sheet 1
FIG. I
FIG. II
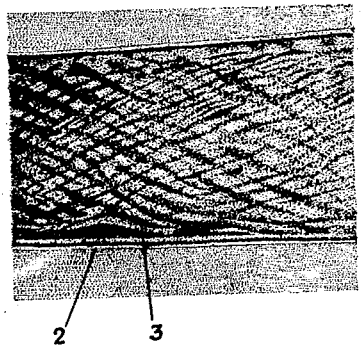
FIG. III
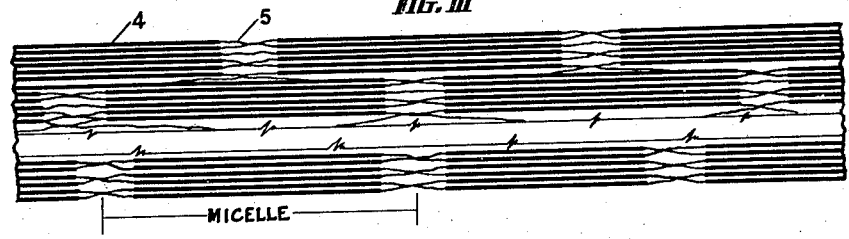
FIG. IV
FIG. V
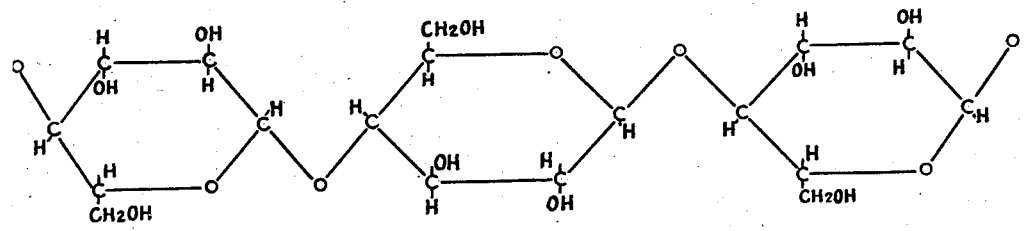
Inventor
RALPH F. NICKERSON
By Ely & Frye
Attorneys March 27, 1945.　　R. F. NICKERSON　　2,372,601
CORD AND METHOD OF MAKING SAME
Filed May 27, 1941　　2 Sheets-Sheet 2
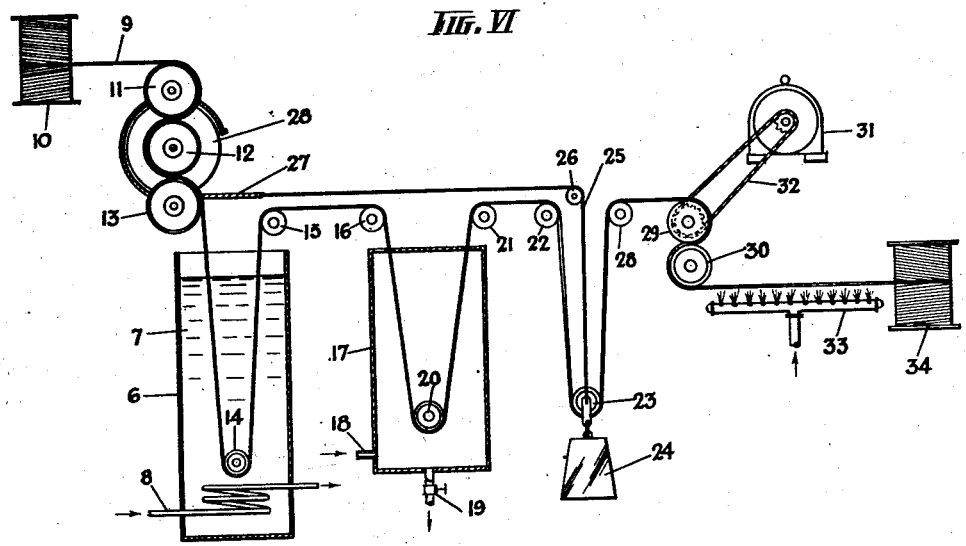
Fig. VI
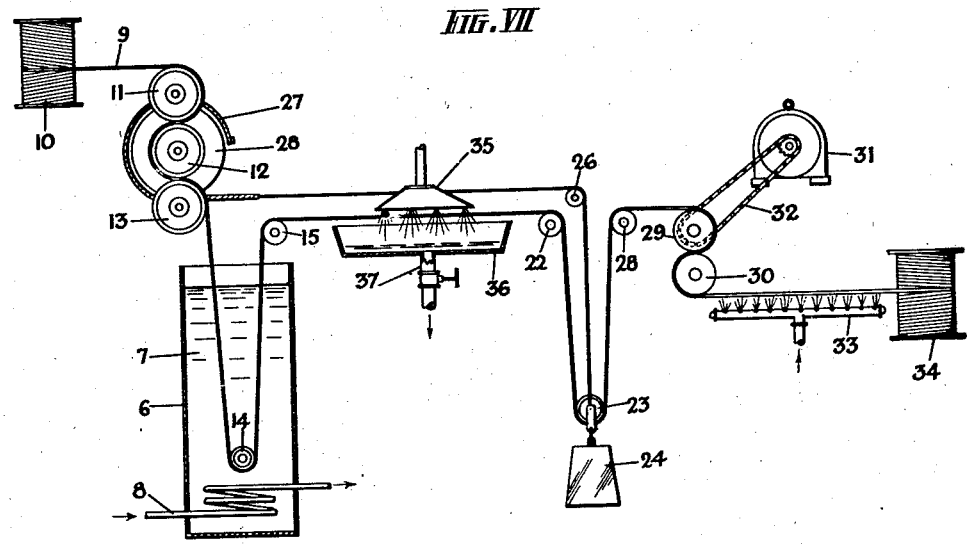
Fig. VII
Inventor
RALPH F. NICKERSON
By Ely & Frye Patented Mar. 27, 1945

2,372,601

UNITED STATES PATENT OFFICE 2,372,601

CORD AND METHOD OF MAKING SAME

Ralph F. Nickerson, Pittsburgh, Pa., assignor, by mesne assignments, to National Cotton Council of America, Memphis, Tenn., a corporation of Tennessee Application May 27, 1941, Serial No. 395,348

4 Claims. (Cl. 117—7)

This invention relates to a novel type of cotton cord or fabric and to a method of making the same, and relates especially to an improved cotton tire cord.

The reenforcing cord or fabric incorporated in the present-day pneumatic tire must withstand severe conditions of service and, especially at high operation speed, should retain a margin of safety commensurate with the hazards involved. For tires designed to be used at low internal pressures such as the passenger car types or at high pressures with heavier loads as the motor truck types, the requirements of the reenforcing cord fabric, or cord as it is commonly called, are very similar. In the one case low internal pressure affords a soft tire which is capable of absorbing a part of each impact it receives but this absorption occurs through flexure of the tire walls. In the other case high internal pressures tend to transmit the entire forces of impact but the inertia of the heavy load opposes this and, as a result, a portion of each impact gives rise to tire flexure.

Such flexing represents work done on the tire against internal friction and the energy so expended appears as heat. The greater the flexing effect, whether from large amplitudes as in under-inflated or overloaded tires or from high frequency as at high speeds or from combinations of them, the more rapidly is heat generated. In addition, the tire acquires heat from external friction against the traction surface. Furthermore, rubber exhibits low thermal conductivity in consequence of which heat is dissipated more slowly than it is formed and the tire temperature rises. It is evident, therefore, that the characteristics of a suitable cord are ability to be ever strong, to remain at substantially unchanged length under prolonged high stresses, to flex rapidly without fatigue for long periods of time, to maintain these properties at high temperatures and, at the same time, to resist heat degradation more or less completely and indefinitely.

It appears that cellulosic materials possess the virtues of being abundant and of having many of the desirable characteristics in appreciable quantities but none, either natural or synthetic, is completely satisfactory in all respects. Raw cotton in the form of cord was the principal tire fabric material for many years and, only when synthetic cellulosic fabrics were introduced for the same purpose, could relative evaluations of performance be made. The synthetic cellulosic cord is now known to have the advantages of high strength at elevated temperatures (which permits the construction of thinner-walled tires more conducive to rapid heat dissipation) and of longer flex-life than raw cotton cord. It has certain disadvantages, however, in cost and in a tendency to flow under prolonged high stresses. On the other hand cotton is a low-cost, abundant, non-flowing material, but it possesses a relatively short flex-life and exhibits a considerable adverse variation of strength properties with temperature.

It has been ascertained that one of the principal handicaps to maximum performance by raw cotton cords is the slippage of the relatively short fibers past one another especially during flexing and at high temperatures. In a copending application, Serial Number 342,697, filed June 27, 1940, I have described a mechanical treatment which effects an increase in cord density and thereby increases the contact of fibers against one another. The greater fiber-to-fiber contacts increase the tenacity of the cord with consequent increments in flex-life and strength. In further studies designed to throw light on the fiber structure-properties relationship, I have obtained information which has enabled me to invent a new treatment for cotton cord. The practice of this invention yields a cotton tire cord far superior to any cotton cord known and as suitable for high speed tires as the best synthetic cord.

A primary object of the present invention is to provide a novel cotton cord or thread having greatly increased flex-life, increased breaking strength and high resistance to heat degradation.

Another object is to provide a method of producing the novel cord or thread.

A further object is to provide a novel modification of cotton fiber structure in which the intramicellar capillaries contain a substance that prevents their collapse and thereby to provide cotton fibers which resist the loss of beneficial characteristics on the application of heat thereto.

Further objects and advantages of the invention will be apparent from the specification and the accompanying drawings, in which:

Figure I is an enlarged view of raw cotton fibers;

Figure II is a greatly enlarged view of a portion of a swollen cotton fiber;

Figure III is a diagrammatic view of a portion of a cotton fibril, showing probable micellar structure;

Figure IV is an idealized diagrammatic view of the building blocks of the cellulose fibril;

Figure V is a structural chemical formula of a portion of a cellulose chain;

Figure VI is a diagrammatic elevation, partly in section, of one type of apparatus suitable for use in the present method; and Figure VII is a diagrammatic elevation, partly in section, of another type of apparatus suitable for use in the present method.

Raw cotton contains about 10 per cent by weight of miscellaneous organic and inorganic matter but, for practical purposes, it is necessary to direct attention only to the principal constituent, cellulose. Native cotton cellulose is now known to consist entirely of long, unbranched, primary valence chains of anhydro-$\beta$-glucose units. In sub-microscopic structure this native cellulose is disposed in two components, one dense, crystalline and discontinuous, and the other non-crystalline, amorphous or expanded. Since the cotton fiber is strong, it is evident that the non-crystalline component supplies the continuity of structure between the small crystalline blocks.

The attached drawings, particularly Figures I to V, afford a visual representation of the various states of sub-division of the cotton fiber structure. It is seen in Figure I that a single fiber 1 (enlarged about 250 times) twists upon itself to impart mechanically a small amount of elasticity to the fiber. Figure II shows a portion of a fiber 2 (enlarged about 1,100 times) swollen by cuprammonium hydroxide solution. The striations 3 are clearly apparent and show the spiralling parallel arrangement of the fibrils which make up the structure of the fiber. Figure III shows a detailed representation of the probable structure of a single fibril, the single lines 4 and 5 representing single cellulose chains. The parallel heavy lines 4 represent the closely packed anhydro-$\beta$-glucose chains in the crystalline structure of a cellulose "building block," and the lighter weaving lines 5 represent the amorphous structure between the building blocks. A single building block or micelle is made up of a single crystalline block and adjacent amorphous or "non-packed" chains. A simplified representation of a cellulose micelle, Figure IV, shows the crystalline portion of the micelle as a series of closely packed, parallel cellulose chains 4 continuous at both ends with the open cellulose chains 5 which make up the amorphous structure. Figure V is the accepted chemical structure of a portion of a cellulose chain and shows that the chain is made of numerous anhydro-$\beta$-glucose units connected to each other through the cellobiose linkage.

The average diameter of a cotton fiber is about 15$\mu$, whereas the fibril diameter is in the order of 1$\mu$ or 10,000 Å. units. The diameter of the crystalline block of a micelle is about 60 Å. units. The length of a micelle is 600 to 1,000 Å. units, of which the crystalline portion constitutes 85 to 95 per cent of the total.

A single cotton fiber contains thousands of long unit structures of the type shown and, in essence, many properties of the fiber are largely the summation of those of these tiny parts. It can be seen in Figures III and IV, and it has been found experimentally, that there is a gradual transition from truly dense crystalline blocks of cellulose to the most expanded, amorphous part of the surrounding network. The intervening semi-crystalline regions have a profound influence on fiber behavior. It is instructive, therefore, to examine one of these unit structures, such as that shown in Figure IV, in more detail.

From analogy with visible crystals, it is inferred that the blocks of crystalline cellulose or crystallites are rigid and more or less impermeable. Conversely, the amorphous cellulose is labile and permeable in proportion to the degree of its expansion. The properties of such a structure are a high strength determined by the long, primary-valence chains and a limited flexibility permitted by the labile, easily-deformed, amorphous articulations. The behavior is somewhat analogous to a metal chain which consists of rigid links and periodic articulations. Since the amount of amorphous cellulose in native cotton is very low, it is apparent that a corresponding restriction is placed upon flexibility and deformability or plasticity.

When the cotton fiber is saturated with water, the latter enters the permeable, amorphous network to a maximum depth and simultaneously causes the fiber to swell. This engorgement produces expansion in the regions of intermediate density and, in effect, increases the amount of labile, expanded network. As a result the wet fiber is many times more plastic than the dry. Dehydration has the opposite result. As water is driven from the fiber, collapse occurs and the effective length of the rigid crystallite increases at the expense of the labile non-crystalline cellulose. In consequence, the fiber becomes less flexible and more stiff or rigid.

High tire temperatures cause dehydration and appear to produce the latter effects. Flexed in a dry condition, these dry, stiff or wiry cotton fibers of a cord no longer cling well and slippage occurs readily. Thus, failure is brought about prematurely. Similarly, when a load is applied to the dry cord, the wiry fibers oppose the forces tending to deform them and to render the cord compact. As a result, the cord structure remains open, the maximum amount of fiber-to-fiber clinging is not realized and hence, cord strength is reduced. For example, upon dehydration to bone-dryness a conventional cotton cord may lose a third or more of its maximum strength.

It follows, then, that the low flexibility and reduced strength of dry cotton cord, or of cotton cord at the high temperature of severe service, are directly associated with the intramicellar collapse which occurs when moisture is driven from the expanded network. The latter becomes more dense and acquires rigid properties. If now, an inert, non-volatile, high melting solid be deposited in, or in and around, the swollen, expanded network, intramicellar collapse and its consequences can be prevented with beneficial effects on cord properties.

This invention relates, in part, to the methods by which this desired result can be achieved. A practical method of depositing the stable solid in the swollen network of intramicellar capillaries comprises thoroughly impregnating the cotton with a solution of the solid. Since the solid to be deposited must be capable of maximum penetration into the ultimate capillaries of the semi-crystalline cellulose, it must be water soluble and of relatively small molecular size. Aqueous solutions are most effective because water is one of the few liquids capable of producing the swelling or expansion. In addition to small molecular size in solution, the solid must form fairly concentrated solutions so that a sufficient amount of residue is conveyed to the capillaries. Also, the solid must be non-volatile if loss by evaporation at tire service temperatures is to be avoided, and neither it nor its degradation products must affect the cotton adversely. Preferably, the material should remain solid at tire service temperatures, or should, at least, not melt completely at these temperatures.

Especially suitable for use in the invention are certain sugars, such as, for example, cellobiose, galactose, glucose, lactose, maltose, mannose, sorbose and sucrose. Some sugar alcohols likewise possess the desired properties, for example, dulcitol and mannitol. Certain dextrins of low molecular weight may also be used in lieu of the above sugars or sugar alcohols in order to produce the desired changes in cotton fibers.

Of the various materials mentioned above for impregnating the cotton fibrils, I prefer to use sugars. Some of the latter, especially glucose and sucrose, are abundant and inexpensive, are water soluble and form concentrated solutions, are non-volatile and stable. At extremely high temperatures the sugars lose water and caramelize but would still leave an inert but effective residue in the capillaries. Such loss of water would not influence tire performance and would, in fact, prevent the formation of small, abrasive crystals. Another advantage may be attributed to sugars, that is, they are highly compatible with cellulose; itself a slightly modified sugar. I have found that a 40 to 60 per cent solution by weight of glucose or sucrose is eminently satisfactory for general use.

The introduction of the solid into the intramicellar capillaries can be accomplished in a number of ways but I have observed that the most rapid is simply to boil the raw cord in the concentrated solution of solid. Boiling speeds the penetration and expansion of the amorphous network and facilitates the displacement of air occluded in the capillaries. Another means of effecting rapid and thorough penetration of the solution is to employ a submerged squeezing device, such as opposing rolls, which aids in the expulsion of air and prevents low local concentrations of solid at places where the raw cord contained previously absorbed moisture. Another method of impregnating the cord is to remove air from the cord, as by evacuating, and then to pass the cord through the solution under pressure.

During a treatment such as that just described the lateral swelling of fibers tends to produce a shortening of the cord. A suitable stretching means should, therefore, be used if the completely processed product is to possess low stretch properties. The cord may be boiled in the concentrated solution and, subsequently, stretched as a separate operation or, preferably, the cord is firmly held at the desired final length throughout the boiling.

The cord emerges from the boiling solution of solid with a large excess of solution retained between the fibers. This excess can be removed by subjecting the cord to the action of moist steam for a few seconds. Since the excess of concentrated solution has an elevated boiling point as a result of its solute, it condenses some of the steam. The effect is to produce a superficial washing of the cord before diffusion from the capillaries can occur. Alternatively, the impregnated cord can be washed by spraying it with a small amount of, preferably, warm water. If the cord is boiled without tension in the concentrated solution, the stretching and washing treatments are combined. In a preferred method, the washing is carried out immediately after the boiling treatment without relaxation of tension.

Finally, the processed cord is cooled, the tension released and the more or less dry product is recovered, or the cord may be dried at slightly elevated temperatures under low tensions.

Two forms of apparatus suitable for applying the method of the invention to cotton cord are shown in Figures VI and VII. Referring first to Figure VI, there is shown a tank 6 containing a cotton fibril impregnating solution 7 and provided with a steam coil 8 for heating the solution. Cotton cord 9 from a supply spool 10 passes around snub rolls 11, 12 and 13 into the tank 6 and around a pulley 14 near the bottom of the tank. The cord continues from the tank 6 over pulleys 15 and 16 into a steam-washing chamber 17. The chamber 17 is provided with a steam inlet 18 and a drain pipe 19. The cord passes around a pulley 20 near the bottom of the chamber 17 and then leaves the chamber, passing over pulleys 21 and 22 to a pulley 23, the latter carrying a weight 24. The pulley 23 is connected to a flexible wire or the like 25, which wire passes over a pulley 26 and attaches to a snub-roll-braking strap 27, which may be of leather. The strap 27 is wound partially around a braking drum 28, which drum is rigidly attached to one end of the snub roll 12. From the pulley 23 the cord passes around a pulley 28 to and around snub rolls 29 and 30, the roll 29 being driven by a motor 31 through a chain 32. From the snub roll 30 the cord passes over a parallel perforated pipe 33, designed to supply drying air to the cord, and thence to a wind-up spool 34, which spool is driven by a suitable means (not shown).

When a cord is treated in the apparatus shown in Figure VI, it is held under a substantial and constant tension or stress between the snub rolls 13 and 29, by means of the weight 24 and the indirectly attached braking strap 27. It is apparent that the weight 24 applies the desired stress directly to the cord, and the braking strap controls the snub rolls 11, 12 and 13 so that a substantially constant length of cord is between the rolls 13 and 29. Thus, when the cord begins to come through the snub rolls 11, 12 and 13 faster than it is passing around the snub rolls 29 and 30, the weight 24 starts to drop lower, pressing the braking strap 27 against the brake drum 28, and so reducing the rotating speed of the snub rolls 11, 12 and 13. Conversely, when the cord begins to come through the snub rolls 11, 12 and 13 slower than it is passing around the snub rolls 29 and 30, the weight 24 starts to rise, releasing the braking strap 27 slightly, so that the rolls 11, 12 and 13 begin to rotate slightly faster.

Obviously, the time the cord remains in the impregnating solution 7 or the steaming chamber 17 may be controlled by controlling the dimensions of the tank 6 and/or chamber 17 and the positions therein of the respective pulleys 14 and 20. A further direct control of the treating time is effected by controlling the rotating speed of the snub roll 29. If desired, the tank 6 may be provided with a condensing means (not shown) for condensing vapor from the hot solution 7 and returning the condensate thereto.

A modified form of apparatus is shown in Figure VII, the modification consisting in the substitution of the steam-washing chamber 17 by means for water-washing the impregnated cord. To this end a water spray 35 is positioned above the cord 9 after the latter has emerged from the tank 6. Beneath the spray is a receptacle 36 for receiving the wash water from the spray. The receptacle 36 is provided with a drain pipe 37.

The effects produced by the novel processing method are shown in the following examples.

EXAMPLE 1

A conventional cotton tire cord of 21/5/3 construction is treated in apparatus similar to that shown in Figure VI, except that the snub rolls 11, 12 and 13 are positioned between the tank 6 and the chamber 17, so that the cord is impregnated under no substantial tension. The cord is passed through a boiling 50 per cent sucrose (or glucose) solution (solution 7) for two minutes. The impregnated cord is then placed under a stress of eight pounds and steamed in the chamber 17 for fifteen seconds to remove the excess sugar from the cord. The cord is then cooled and dried. The breaking strengths of various samples of the treated cord, when conditioned to normal moisture content and when bone dry, are compared with the breaking strengths of the corresponding untreated control cords in Table 1.

TABLE 1

| Sample number | Treated | | Simultaneous control | |
|---|---|---|---|---|
| | Conditioned strength | Bone-dry strength | Conditioned strength | Bone-dry strength |
| | Pounds | Pounds | Pounds | Pounds |
| 1 | 22.45 | 21.33 | 18.74 | 15.15 |
| 2 | 22.16 | 22.15 | 18.81 | 14.79 |
| 3 | 22.51 | 22.38 | 18.19 | 14.65 |
| 4 | 22.43 | 22.32 | 19.61 | 15.00 |
| 5 | 23.13 | 22.38 | 19.69 | 15.22 |
| 6 | 21.83 | 21.31 | 18.99 | 15.19 |
| 7 | 24.79 | 23.61 | 19.68 | 15.79 |
| 8 | 23.79 | 23.24 | 19.38 | 15.81 |
| Average | 22.89 | 22.34 | 19.14 | 15.20 |

It can be seen that, on the average, conventional cotton cord (control) loses about 3.94 pounds or about 20.6 per cent of its conditioned strength as it is taken to bone-dryness. On the other hand cord treated according to this invention not only has a higher strength but also loses only about 0.55 pound or about 2.4 per cent of its moist strength under the same conditions. These data suggest that the strength of treated cotton cord would not vary with state of dehydration during tire service.

EXAMPLE 2

The cords produced according to Example 1 are tested on the "snap cycle" flexing apparatus described and claimed in United States Patent No. 2,157,092. The flexing lives of the cords, in terms of the number of complete flexes before failure, are compared in Table 2 with the flexing lives of the corresponding control cords.

TABLE 2

| Sample number | Control | Treated | Relative per cent based on control as 100 |
|---|---|---|---|
| 1 | 7,990 | 56,730 | 711 |
| 2 | 5,560 | 31,250 | 562 |
| 3 | 5,760 | 28,400 | 493 |
| 4 | 6,980 | 13,970 | 200 |
| 5 | 8,130 | 51,480 | 633 |
| 6 | 5,790 | 42,020 | 726 |
| 7 | 5,000 | 43,215 | 870 |
| 8 | 3,311 | 22,346 | 675 |
| Average | 6,065 | 36,176 | 609 |

Again, it is apparent that the flex-life of the treated samples far exceeds that of the control, conventional cotton cord.

EXAMPLE 3

A preferred treatment is conducted in apparatus similar to that shown in Figure VI. In passing continuously through the apparatus, a conventional cotton tire cord of 21/5/3 construction is first placed under eight pounds of tension and then boiled for one minute in a 40 to 50 per cent solution of sucrose (or glucose). The impregnated cord is steam-washed under tension for fifteen seconds. The tension is released from the washed cord, which is cooled and wound up as usual. Table 3 shows the improvement in breaking strength and flex-life of two samples treated according to this preferred method.

TABLE 3

Sample 1

| | Control | Treated | Relative per cent based on control as 100 |
|---|---|---|---|
| Conditioned strength | 19.41 lbs | 24.39 lbs | 126 |
| Bone-dry strength | 14.93 lbs | 23.62 lbs | 158 |
| Flexes | 6,010 | 86,230 | 1,430 |

Sample 2

| | Control | Treated | Relative per cent based on control as 100 |
|---|---|---|---|
| Conditioned strength | 18.24 lbs | 22.93 lbs | 125 |
| Bone-dry strength | 14.56 lbs | 22.91 lbs | 157 |
| Flexes | 7,550 | 101,700 | 1,350 |

The data indicate that this preferred treatment stabilizes the cord against dehydration-strength losses and extends the flex-life about 13 times.

EXAMPLE 4

Cotton cord of the type hereinbefore processed is treated according to the method of Example 1, the sugar concentration of the impregnating solution being varied between 20 and 60 per cent. The results are shown in Table 4.

TABLE 4

| Sugar concentration | 20 per cent | | 40 per cent | | 60 per cent | |
|---|---|---|---|---|---|---|
| | Control | Treated | Control | Treated | Control | Treated |
| Conditioned strength in pounds | 19.30 | 19.74 | 18.99 | 21.83 | 19.33 | 22.78 |
| Bone-dry strength in pounds | 15.32 | 19.50 | 15.19 | 21.31 | 15.35 | 21.91 |
| Flexes | 5,270 | 25,450 | 5,790 | 42,020 | 7,080 | 38,110 |

Optimum sugar concentration appears to be between 40 and 60 per cent.

Further experiments have shown that satisfactory results are obtained by reducing the boiling time to a few seconds, e. g., 10 to 20 seconds. Likewise, the time for steam-washing may be shortened to 5 or 10 seconds without interfering with the efficiency of this treatment, and only a fraction of this time is required for water-washing the cord. The function of the washing step is to remove excess of the impregnating material from the gross structure of the cord, and the washing time may obviously be varied within wide limits, so long as this function is carried out.

It will be apparent to those versed in the art that a new principle in the use and treatment of native cellulosic materials has been discovered and that substances other than sugars can be employed to produce the effects herein described. Although the previous discussion has been concerned largely with tire cord, it is obvious that the new principle can be extended to include unrelated uses of native cellulosic materials in which high flexibility or long flex-life are desirable.

The two undesirable features of raw cotton cord, namely, strength loss upon dehydration and low flex-life, are largely corrected by the practice of the present invention. The novel cotton cord compares well in strength with rayon tire cord and possesses a flex life of the same high order as possessed by the best rayon cord. In view of the lower cost of the novel cotton cord and the fact that it does not flow under prolonged high stresses, it has commercially practical advantages over the synthetic product for use in tires.

The unique properties of the novel cotton cord make it also eminently suited for reinforcing rubber fan belts and other reinforced rubber structures. Moreover, the new cord or thread may also be used in other applications where strength, irrespective of variations in atmospheric conditions, and flex life of the cord are important.

The invention described in detail in the examples and other portions of the specification is meant to be construed as broadly as possible in view of the prior art. The present invention includes all features of patentable novelty residing in the foregoing specification and the accompanying drawings.

What is claimed is:

1. A method of treating cotton cord which comprises the steps of placing the cord under a stretching tension, passing the tensioned cord through a boiling aqueous solution containing from about 20 to about 60 per cent of sucrose, washing the tensioned impregnated cord by subjecting it to steam, releasing the stretching tension from the cord, and then cooling and partially drying the cord by blowing air around the cord.

2. A method of treating cotton cord which comprises the steps of placing the cord under a stretching tension, passing the tensioned cord through a boiling aqueous solution containing from about 20 to 60 per cent of glucose, removing the excess of glucose from the tensioned cord by washing same, and releasing the stretching tension from the cord.

3. A method of treating cotton cord which comprises the steps of placing the cord under a stretching tension, impregnating the tensioned cord with a hot aqueous solution containing from about 20 to 60 per cent of a non-volatile, high melting sugar, washing out the excess sugar surrounding the fibers of the cord while retaining sugar in said fibers, and releasing the stretching tension from the cord.

4. A method of treating cotton cord which comprises the steps of placing the cord under a stretching tension, impregnating the tensioned cord with a hot aqueous solution containing from about 20 to 60 per cent of sucrose, washing out the excess sugar surrounding the fibers of the cord while retaining sugar in said fibers, and releasing the stretching tension from the cord.

RALPH F. NICKERSON.